US010542267B2

(12) United States Patent
Cook (10) Patent No.: US 10,542,267 B2
(45) Date of Patent: Jan. 21, 2020

(54) CLASSIFICATION PRESERVING IMAGE TRANSFORM COMPRESSION (71) Applicant: SAMSUNG DISPLAY CO., LTD., Yongin, Gyeonggi-Do (KR)

(72) Inventor: Gregory W. Cook, San Jose, CA (US)

(73) Assignee: Samsung Display Co., Ltd., Yongin-si (KR)

(*) Notice: Subject to any disclaimer, the term of this patent is extended or adjusted under 35 U.S.C. 154(b) by 255 days.

(21) Appl. No.: 15/003,508

(22) Filed: Jan. 21, 2016

(65) Prior Publication Data
US 2017/0214928 A1 Jul. 27, 2017

(51) Int. Cl.
H04N 19/426 (2014.01)
H04N 19/124 (2014.01)
H04N 19/136 (2014.01)
H04N 19/182 (2014.01)
H04N 19/184 (2014.01)
H04N 19/44 (2014.01)
H04N 19/60 (2014.01)
H04N 19/91 (2014.01)
G06K 9/46 (2006.01)
G06K 9/52 (2006.01)
G06K 9/62 (2006.01)

(52) U.S. Cl.
CPC ......... H04N 19/426 (2014.11); G06K 9/4642 (2013.01); G06K 9/52 (2013.01); G06K 9/6267 (2013.01); H04N 19/124 (2014.11); H04N 19/136 (2014.11); H04N 19/182 (2014.11); H04N 19/184 (2014.11); H04N 19/44 (2014.11); H04N 19/60 (2014.11); H04N 19/91 (2014.11)

(58) Field of Classification Search
None
See application file for complete search history.

(56) References Cited

U.S. PATENT DOCUMENTS

| 6,026,180 | A | * | 2/2000 | Wittenstein | .......... | H04N 19/503 375/E7.14 |
| 6,904,176 | B1 | | 6/2005 | Chui et al. | | |
| 8,170,357 | B2 | | 5/2012 | Kim et al. | | |
| 8,437,564 | B2 | | 5/2013 | Harmanci et al. | | |
| 8,964,835 | B2 | | 2/2015 | Pace | | |
| 9,813,711 | B2 | * | 11/2017 | MacInnis | ............... | H04N 19/63 |
| 9,813,721 | B2 | * | 11/2017 | Schulze | ............... | H04N 19/132 |
| 2002/0027617 | A1 | * | 3/2002 | Jeffers | ................. | H04N 5/2723 348/587 |

(Continued)

OTHER PUBLICATIONS

McLean, G.F., "Vector Quantization for Texture Classification", IEEE Transactions on Systems, Man, and Cybernetics, vol. 23, No. 3 (May/Jun. 1993).*

(Continued)

Primary Examiner — Lindsay J Uhl
(74) Attorney, Agent, or Firm — Lewis Roca Rothgerber Christie LLP (57) ABSTRACT A method of data compression, the method including receiving image data corresponding to an input image, generating a plurality of classifications of pixels of the input image, generating a bitmask corresponding to the classifications of pixels, and running a sparse transform on each of the classifications of pixels to generate a plurality of transform coefficients.

14 Claims, 7 Drawing Sheets (56) References Cited

U.S. PATENT DOCUMENTS

| | | |
|---|---|---|
| 2013/0182758 A1 | 7/2013 | Seregin et al. |
| 2014/0086307 A1 | 3/2014 | Karczewicz et al. |
| 2014/0169451 A1 | 6/2014 | Cohen et al. |
| 2015/0229948 A1 | 8/2015 | Puri et al. |
| 2015/0358645 A1* | 12/2015 | Thirumalai .......... H04N 19/119 375/240.02 |
| 2016/0301933 A1* | 10/2016 | Jacobson ............... H04N 19/14 |
| 2017/0013278 A1* | 1/2017 | Mizuno ................ H04N 19/172 |

OTHER PUBLICATIONS

Pujara, H., et al., "Image Segmentation using Learning Vector Quantization of Artificial Neural Network", International Journal of Advanced Research in Artificial Intelligence, vol. 2, No. 7 (2013) (Year: 2013).*

Kurita, T. et al., "A Method of Block Truncation Coding for Color Image Compression", IEEE Transactions on Communications, vol. 41, No. 9 (Sep. 1993) (Year: 1993).*

Ravinshankar, S., et al., "Learning Sparsifying Tranforms", IEEE Transactions on Signal Processing, vol. 61, No. 5, pp. 1072-1086 (Mar. 1, 2013) (Year: 2013).*

* cited by examiner

CLASSIFICATION PRESERVING IMAGE TRANSFORM COMPRESSION

BACKGROUND

1. Field

Embodiments of the present invention relate to data compression, and more particularly, relate to image data compression.

2. Related Art

Data compression may be used to take input data, such as data corresponding to an image, or such as data corresponding to multiple images in a video, and to convert the input data to compressed output data. The compressed output data will include fewer bits than, or will have a smaller bandwidth than, the uncompressed input data. However, despite not identically replicating the original input data, the output data, once decompressed, should be a suitable representation of the uncompressed input data.

Display stream compression (DSC) may be used to reduce power in a display panel interface, to increase the interface's payload capacity, or both. Present DSC technology can attain a visually lossless reconstruction of 24-bit RGB pixel data that is compressed to a compression ratio of approximately 3 to 1 with acceptable circuit complexity and power, the compression ratio referring to a ratio of the size of the uncompressed image data (e.g., input bits) to the size of the compressed image data (e.g., output bits). Advanced DSC, however, is attempting to attain a visually lossless reconstruction up to approximately a 4 to 1 compression ratio, meaning that no visually perceivable differences exist between the uncompressed input image and the compressed output image.

However, currently used methods for compressing image data may result in the creation of compressed images that contain unwanted streaking artifacts when the original input image contains a hard "edge" (e.g., a boundary, a jump, a discontinuity, or a singularity in the image, which may be caused by a sharp transition from a foreground to a background, or which may be caused by adjacent groups of pixels representing contrasting colors). The ringing, which may also be referred to as streaking or overshoot, is caused by an effect known as Gibbs Phenomenon, which may be a result of running a mathematical transform across the edge within the image during the compression of the image.

The above information disclosed in this Related Art section is only to enhance the understanding of the background of the invention, and therefore it may contain information that does not constitute prior art.

SUMMARY

Embodiments of the present invention improve coding efficiency for systems by performing an m-ary (e.g., binary, ternary, etc., where m corresponds to an integer) vector quantizer pixel classification, and by using a sparse transform (e.g., a sparse Hadamard transform) on each classification (e.g., each color group) of classified pixels. Accordingly, transform coding may be improved in cases where there are large vector differences (e.g., color differences) in a particular image block, for which classical transform coding tends to manifest as ringing/streaking/overshoot artifacts.

Embodiments of the present invention may be effective on mixed images containing both computer-generated graphics and natural images, where a bitmask carries a majority of the contrast information, while the transforms carry the color texture information. Embodiments of the present invention may be compatible with a full transform in the event that the full transform is more efficient on any particular image block.

According to one or more embodiments of the present invention, there is provided a method of data compression, the method including receiving image data corresponding to an input image, generating a plurality of classifications of pixels of the input image, generating a bitmask corresponding to the classifications of pixels, running a sparse transform on each of the classifications of pixels to generate a plurality of transform coefficients, and quantizing each transform coefficient with a scalar quantizer.

The generating the plurality of classifications of the pixels may include vector quantizing the input image to generate quantized image data, and the generating the bitmask may correspond to the quantized image data.

The generating the plurality of classifications of pixels may include generating a histogram corresponding to features of the pixels of the input image, and determining a statistical mode of the pixels based on the histogram, and the bitmask may define ones of the pixels that correspond to the statistical mode.

The histogram may include a color histogram or an intensity histogram, and the features of the pixels may correspond to a color of the pixels or a brightness of the pixels.

The method may further include entropy encoding data representing the plurality of transform coefficients.

The method may further include multiplexing the entropy encoded data to generate compressed encoded data.

The method may further include outputting the compressed encoded data.

The method may further include receiving the outputted compressed encoded data, demultiplexing the outputted compressed encoded data to generate separated entropy encoded data, entropy decoding the separated entropy encoded data to generate decoded transform coefficients for each of the classifications of pixels, running an inverse sparse transform that corresponds to the sparse transform on the decoded transform coefficients to generate decompressed image blocks, and summing and arranging the decompressed image blocks to generate a decompressed image.

The generating the plurality of classifications of pixels may be based on a non-linear edge that is visible in the input image.

The sparse transform may be a sparse Hadamard transform.

According to one or more embodiments of the present invention, there is provided a data compression device including an input configured to receive image data corresponding to an input image, a bitmask generator coupled to the input and configured to generate a bitmask based on a plurality of classifications of pixels, a processor coupled to the bitmask generator and configured to run a sparse transform in a spatial domain on each of the classifications of pixels to generate transform coefficients, and a scalar quantizer coupled to the processor and configured to generate quantized transform coefficients.

The data compression device may further include a vector quantizer coupled to the input that is configured to vector quantize the image data to generate the plurality of classifications of pixels and that is configured to send the plurality of classifications of pixels to the bitmask generator.

The data compression device may further include a statistical mode selector coupled to the input and configured to determine a statistical mode of pixels of the input image corresponding to a color or an intensity of the pixels, generate the plurality of classifications of pixels based on the determined statistical mode, and send the plurality of classifications of pixels to the bitmask generator.

The data compression device may further include an entropy encoder coupled to the processor and configured to entropy encode data representing the transform coefficients.

The data compression device may further include a bit multiplexer coupled to the entropy encoder and configured to generate compressed encoded data based on the entropy encoded data, and an output configured to output the compressed encoded data.

According to one or more embodiments of the present invention, there is provided a method of color image compression, the method including receiving image data corresponding to a plurality of pixels, classifying the pixels based on the image data to generate a plurality of classifications of the pixels, running a sparse transform for each of the classifications of the pixels after the pixels are classified to generate transform coefficients, and running a scalar quantizer for each transform coefficient, wherein sparseness of the sparse transform corresponds to a spatial domain of the pixels corresponding to the image data.

The classifying the pixels may include vector quantizing the image data, and the sparse transform may be a sparse Hadamard transform that is run for each classification of pixels after the vector quantizing of the image data.

The classifying the pixels may include determining a statistical mode of the pixels, and classifying the pixels representing the statistical mode as one of the classifications of the pixels.

The determining the statistical mode of the pixels may include performing a histogram.

The method may further include encoding the transform coefficients to generate encoded data, and outputting the encoded data.

BRIEF DESCRIPTION OF THE DRAWINGS

The accompanying drawings, together with the specification, illustrate exemplary embodiments of the present invention, and, together with the description, serve to explain the principles of the present invention, wherein.

DETAILED DESCRIPTION

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including,"

when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic devices or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Some portions of the following detailed descriptions are presented in terms of algorithms and/or symbolic representations of operations on data bits that may occur within a computer/server memory. These descriptions and representations are used by those skilled in the art of data compression to convey ideas, structures, and methodologies to others skilled in the art. An algorithm is a self-consistent sequence for achieving a desired result and requiring physical manipulations of physical quantities, which may take the form of electro-magnetic signals capable of being stored, transferred, combined, compared, replicated, reproduced, and otherwise manipulated. Such signals may be referred to as bits, values, elements, symbols, characters, terms, numbers, or the like. These and similar terms are associated with appropriate physical quantities, and are used as representative labels for these quantities. Accordingly, terms such as "processing," "computing," "calculating," "determining," "displaying" or the like, refer to the action and processes of a computing device or system that manipulates data represented as physical quantities within registers/memories into other data that is also represented by stored/transmitted/displayed physical quantities.

Various methods of image data compression may be used to recreate images using fewer bits of information than are used to represent the original uncompressed images. One method of data compression may be referred to as line-based compression. Some examples of line-based compression include the Video Electronics Standards Association (VESA) Display Stream Compression, which is a Modified Median Adaptive Filter with block and color history, Associated Geometric-based Probability Model, and Gradient Adjusted Prediction. Line-based compression may be visually lossless at a data compression ratio of about 2 to 1, and may even be visually lossless for many images at a data compression ratio of about 3 to 1. However, line-based compression may require complicated rate control, and may be ineffective for compression ratios of about 4 to 1 and higher. Accordingly, for suitable image reproduction, high compression ratios may require a block compression method, such as Block Transform Coding mentioned below.

One method of block compression may be referred to as Vector Quantizer Block Truncation Coding (VQ-BTC). A VQ-BTC system employs vector quantization (e.g., by using a vector quantizer) as the analysis operation, but uses block truncation coding as the compression technique, wherein color pixels of each of several rectangular block are classified (e.g., based on their color) as belonging to one of k classifications as a k-means classifier (k being a natural number that is greater than or equal to 2).

In VQ-BTC, an input image, which corresponds to the input image data to be compressed, may be divided, or partitioned, into several independent classifications of blocks. Two or more pixel classifications representing color values may be selected to preserve mean and variance of each block, thereby naturally preserving edges/jumps/discontinuities that are present in the input image via the classification operation. Further, the different classifications of blocks need not correspond to contiguous areas of pixels, and VQ-BTC is extremely robust to transmission errors, enabling compression ratios of as much as about 6 to 1, although the reconstructed image represented by the output data is not typically visually lossless.

Figure 1:
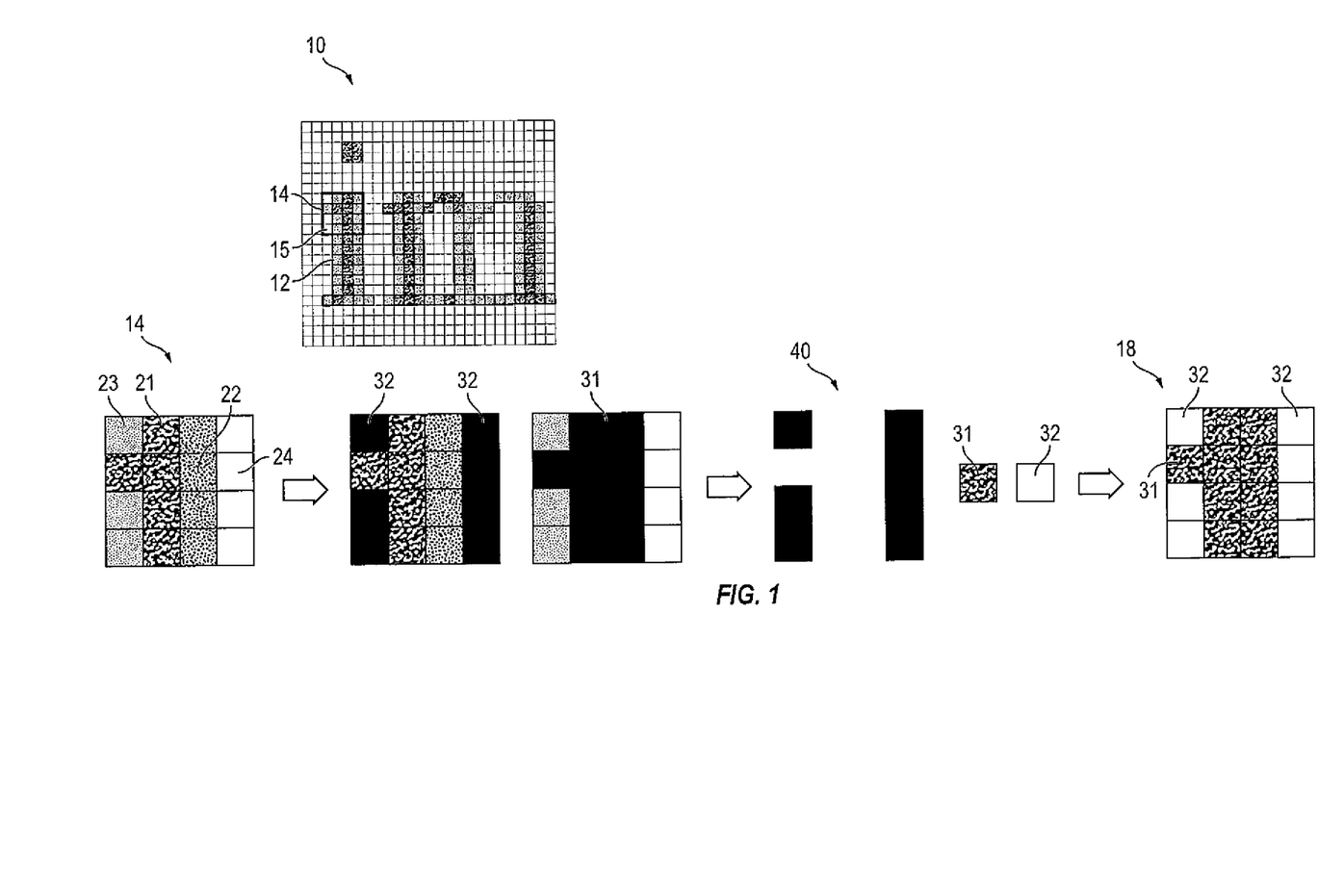
FIG. 1 depicts a method of Vector Quantizer Block Truncation Coding (VQ-BTC)

FIG. 1 depicts a method of VQ-BTC. For example, and referring to FIG. 1, VQ-BTC may be applied to a computer generated image 10, such as an image including computer generated text 12, as the input data to be compressed. As used below, "n-by-n" refers to the pixel dimensions of a partitioned image block in terms of vertical and horizontal dimensions, n being a positive integer. The partitioned image block 14 of the present example is a 4-by-4 block having sixteen pixels 15 (four pixels 15 in a vertical direction, and four pixels 15 in a horizontal direction). It should be noted that image blocks may alternatively comprise n-by-m pixels, where m is a positive integer that is not equal to n.

As can be seen in FIG. 1, the 4-by-4 partitioned image block 14 of pixels 15 of the uncompressed computer generated image 10 is represented by several different colors (e.g., colors 21, 22, 23, and 24). Despite there being more than two colors in the image block 14, in analyzing the image block 14, each of the pixels 15 may be categorized as belonging to a single one of two possible classifications 31 and 32 used to generate a decompressed image block 18 that is created from a compressed version of the image 10. Each of two different colors may effectively represent one of two classifications 31 and 32 of pixels 15, and may be the same as a color that is represented by one or more of the pixels 15 in the image block 14 (e.g., pixels 15 of the uncompressed image 10 having the colors 21 and 24), or may be a color that represents an average (or otherwise similar) color of the corresponding classification of pixels (e.g., a color that is on the color scale between colors 21 and 22 for a first classification 31, or a color that is on the color scale between colors 23 and 24 for a second classification 32).

By categorizing the pixels 15 into one of two color classifications 31 and 32, a bitmask 40 that corresponds to, or "covers," a region(s) representing one of the color classifications (e.g., the classification 31 in the present example) may be produced, such that, upon decompression, the pixels 15 covered by the bitmask 40 can be reproduced as the color of the first classification 31 (e.g., a color 21 of one or more of the pixels covered by the bitmask 40), while the other pixels corresponding to a region(s) not corresponding to the bitmask 40 can be reproduced as the color representing the second classification 32 (e.g., color 24 corresponding to the second classification 32 of the pixels 15). Accordingly, a decompressed image block 18 can be generated using fewer bits of data than the original uncompressed image block 14, and multiple decompressed image blocks 18 may be arranged to generate a decompressed image representing the original image 10. However, using VQ-BTC as a method of compression can be costly, or "data expensive," for acceptable image compression.

One method to implement Vector Quantization may use fast Principal Component Analysis (PCA) via first and second moments/classifications, and may then develop an adaptive threshold based on the PCA. PCA uses a linear transformation (e.g., a Karhunen-Loe've transform (KLT)) to reduce p-dimensional feature vectors to m-dimensional feature vectors (m and p being integers with m being less than p).

Another method of data compression is referred to as Block Transform Coding. Transform Coding is a type of data compression that is used for, for example, photographic images in a video stream. The transformation that occurs during data compression in Block Transform Coding is typically lossy, meaning that the decompressed/reconstructed output image(s) is typically of a noticeably lower quality than the original uncompressed input image(s). This is due to the use of a scalar quantizer on each of the transform coefficients after the transform step, discussed in more detail below. Different methods of transform coding may be chosen based on the characteristics of the information to be discarded and lost during the data compression, causing a corresponding compressed output data stream to have a lower bandwidth than an uncompressed input data stream containing the input images. The remaining, non-discarded input data may be compressed using a variety of methods, such that a decompressed output will be satisfactory, despite being of lower quality than the input image(s).

Block Transform Coding has been used as a basis for image compression since MPEG-1 format. In Block Transform Coding, fixed block partitioning may be used, which is a compression method that is mentioned in various standards. In Block Transform Coding, each input image may be partitioned into a number of equally sized blocks of pixels (e.g., the image blocks 14 of pixels 15 shown in FIG. 1). Accordingly, when the input image is used to construct n-by-m sub-images/image blocks each containing a corresponding block of n-by-m pixels. Each of the image blocks are then predicted, and are applied to a transform (e.g., a forward transform) to generate transform coefficients of the transform that respectively correspond to the pixels of the image block.

Various transforms may be selected during Block Transform Coding, and may include, for example, a Discrete Fourier Transform (DFT), a Discrete Cosine Transform (DCT), a Wavelet transform, a KLT, a Hadamard Transform, etc. The modern day dominant method of video compression is accomplished using the DCT, which is also used as the standard in JPEG image compression. DCT is useful in compaction of correlations that exist in natural images, and has been effective by putting energy into specific coefficients of the DCT, while leaving many of the coefficients small or zero valued.

The generated transform coefficients produced by the transform may then be quantized to generate quantized transform coefficients. After scanning the quantized transform coefficients to form a one-dimensional vector, a video encoder may entropy encode the one-dimensional vector to produce compressed encoded data including encoded quantized transform coefficients. The compressed encoded data may then be output to a video decoder be decoded and decompressed and arranged into a reconstructed/decompressed image.

That is, upon receiving the compressed encoded data, the data (e.g., the encoded quantized transform coefficients) may be entropy decoded. Then, an inverse quantization process and an inverse transform process, which corresponds to an inverse of the forward transform used to compress the data, may be used to reproduce residual data corresponding to n-by-m decompressed image blocks. The residual data may be combined with predictive data to produce decoded video data, and the n-by-m decompressed images resulting from the inverse transform may be arranged and merged into a decompressed output image, which will typically be of a lower quality than the uncompressed input image due to the quantization step applied after the transform.

By applying a DCT to Block Transform Coding, efficient energy compaction is possible when compressing natural images. However, the presence of edges, boundaries, jumps, discontinuities, or singularities in an input image, which may be a common result of computer generated images, will cause the decompressed output image to have visible ringing/streaking/overshoot. These errors are due to there being an insufficient number of coefficients needed to match the original uncompressed input data. For example, when a singularity (e.g., a non-horizontal, non-vertical, non-linear hard edge, such as edge 22 in FIG. 2, discussed below) is in an image block to be transformed, the DCT may generate many non-zero coefficients to represent the image block, thereby driving up the bit-rate of a corresponding stream containing the image block.

Accordingly, Block Transform Coding can improve ringing/streaking/overshoot by detecting when "flat" areas occur, by lowering quantization step size (potentially generating more bits for "non-flat" areas in the block than otherwise required), and by also partitioning the original image block into subblocks. As a result, Block Transform Coding may not satisfactorily replicate the edge, may be costly and resource-consuming to check all partitions for best rate-distortion trade-off, and does not work for non-contiguous classifications of pixels.

Embodiments of the present invention, described below, maintain the throughput advantage of line-based compression, maintain the edge preserving characteristics of VQ-BTC, and maintain the coding efficiency of Block Transform Coding while efficiently reducing ringing/streaking/overshoot. Embodiments of the present invention provide perceived edge preservation by using fast binary classification, use of the Hadamard Transform for low-complexity transform procedures, efficient coding of "flat" areas in an image block, and low complexity increase.

Figure 2:
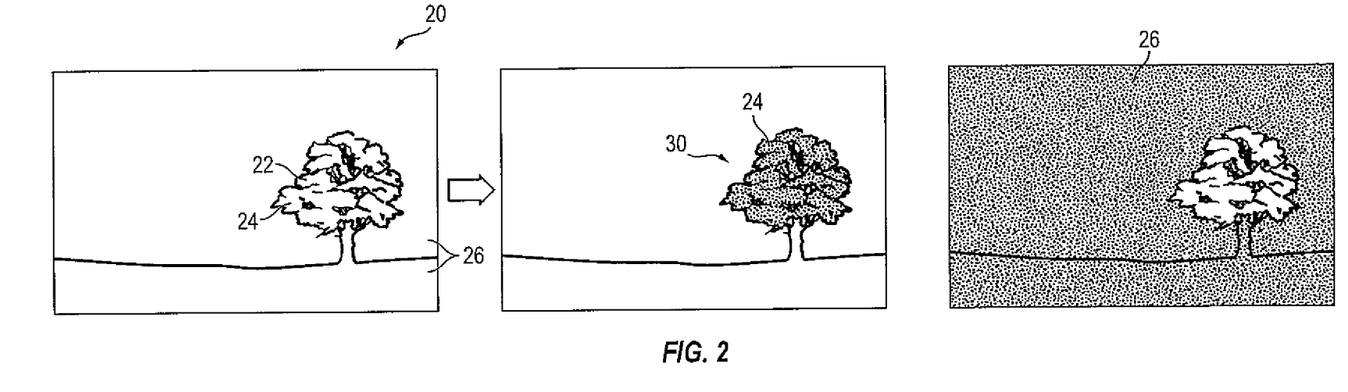
FIG. 2 depicts a method of generating a bitmask for an input image according to an embodiment of the present invention.
Figure 3:
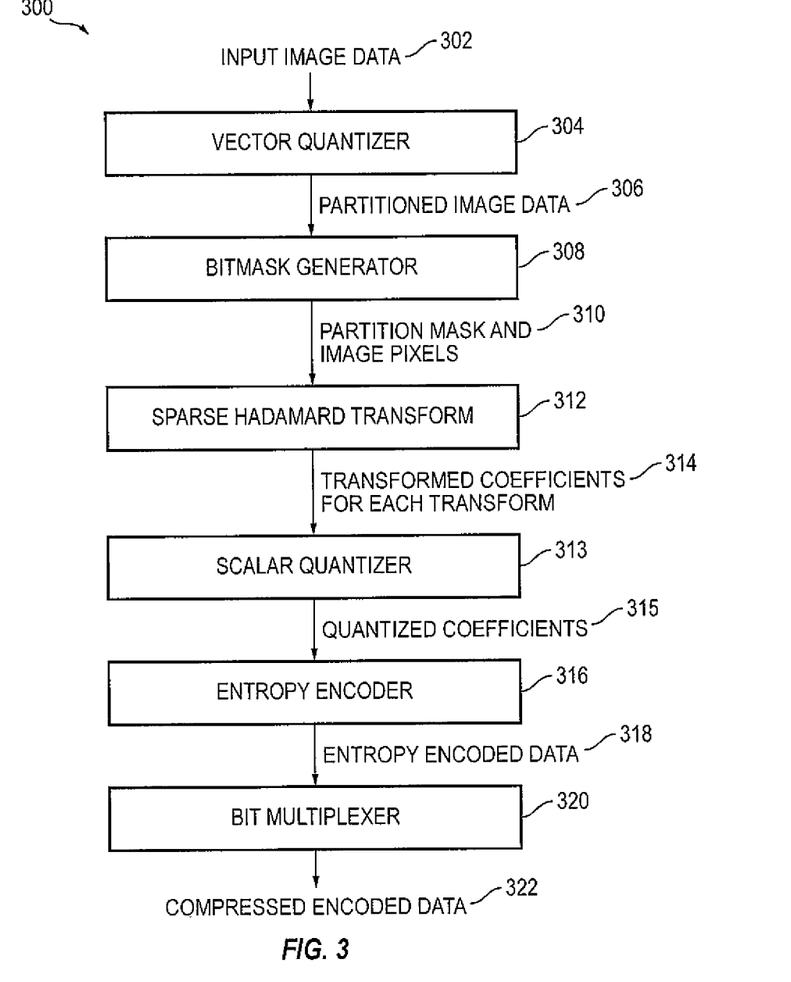
FIG. 3 illustrates a block diagram of a video encoder according to an embodiment of the present invention.

FIG. 2 depicts a method of generating a bitmask for an input image according to an embodiment of the present invention, and FIG. 3 illustrates a block diagram of a video encoder 300 according to an embodiment of the present invention.

Referring to FIGS. 2 and 3, an input of the video encoder 300 (e.g., a data compression device 300) is configured to receive input image data 302 representing an image (e.g., input image data 302 representing the image 20 of a tree in a field, shown FIG. 2), and a vector quantizer 304 is configured to partition the input image data 302 to produce partitioned image data 306 corresponding to classifications of the pixels (e.g., classifications 24 and 26, which are classified based on the hard, non-linear edge 22 that separates the color of the leaves of the tree from the color of the background of the image 20). Although a vector quantizer 304 is used to produce partitioned image data 306 in the present embodiment, in other embodiments, a statistical mode selector may instead receive the input image data 302 to generate classifications of the pixels based on a unique statistical mode of the pixels, as will be described further below with reference to FIG. 7.

A bitmask generator 308 of the video encoder 300 is configured to receive the partitioned image data 306, and is configured to generate a bitmask 30. The generated bitmask 30 of the present example is conceptually similar to the bitmask 40 of FIG. 1, and is based on the partitioned image data 306 corresponding to the classifications 24 and 26 of the pixels (e.g., the classifications 24 and 26 being based on the colors of the pixels, such as the color of the leaves of the tree in the uncompressed image 20). The bitmask generator 308 is then able to send a partition mask and image pixels 310 for each of the classifications 24 and 26 of the pixels, which may be distinguished by referring to the bitmask 30, to be processed by a processor 312 configured to run a sparse Hadamard transform, as will be described in further detail below.

A sparse Hadamard transform may be run on the partitioned image pixels 310 using a processor 312 to generate transformed coefficients 314 for each transform, each transform corresponding to a classification of pixels. These transformed coefficients are then quantized with a scalar quantizer 313 as in standard Block Transform Coding. These quantized coefficients 315 may then optionally be sent to an entropy encoder 316 for further compression.

The entropy encoder 316 is configured to generate entropy encoded data 318 by a method described below.

The entropy encoded data 318 may then be multiplexed by a bit multiplexer 320 to generate compressed encoded data 322. The compressed encoded data 322 may then be sent to a video decoder (e.g., video decoder 400 of FIG. 4, described below) to decompress the compressed encoded data 322, and to reconstruct a decompressed image representing the original uncompressed image.

Figure 4:
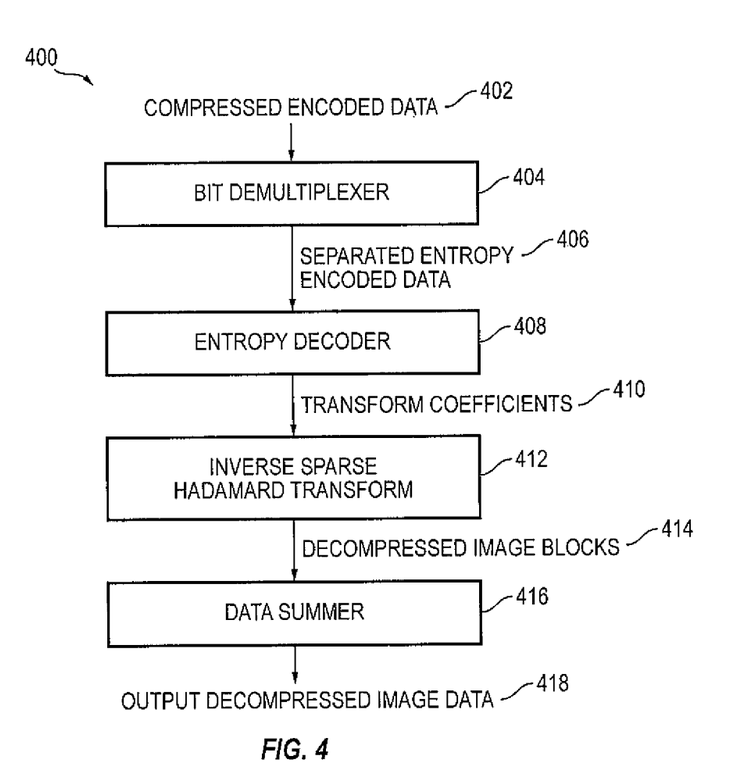
FIG. 4 illustrates a block diagram of a video decoder according to an embodiment of the present invention.

FIG. 4 illustrates a block diagram of a video decoder 400 according to an embodiment of the present invention.

Referring to FIG. 4, compressed encoded data 402 (e.g., the compressed encoded data 322 of FIG. 3) may be received at an input of the video decoder 400, and a bit demultiplexer 404 may process the compressed encoded data 402 to generate separated entropy encoded data 406, which may be sent to an entropy decoder 408.

The entropy decoder 408 may then decode the separated entropy encoded data 406 to generate transform coefficients 410 corresponding to a respective classification of pixels (e.g., classification 24 or classification 26). The transform coefficients 410 may then be sent to a processor 412 that is configured to run an inverse sparse Hadamard transform on the transform coefficients 410 to generate decompressed image blocks 414.

The decompressed image blocks 414 may then be sent to a data summer 416 that is able to sum and arrange the decompressed image blocks 414 to generate output decompressed image data 418, which may then be used to develop a decompressed reconstructed image that is a representation the original uncompressed input image 20.

Figure 5:
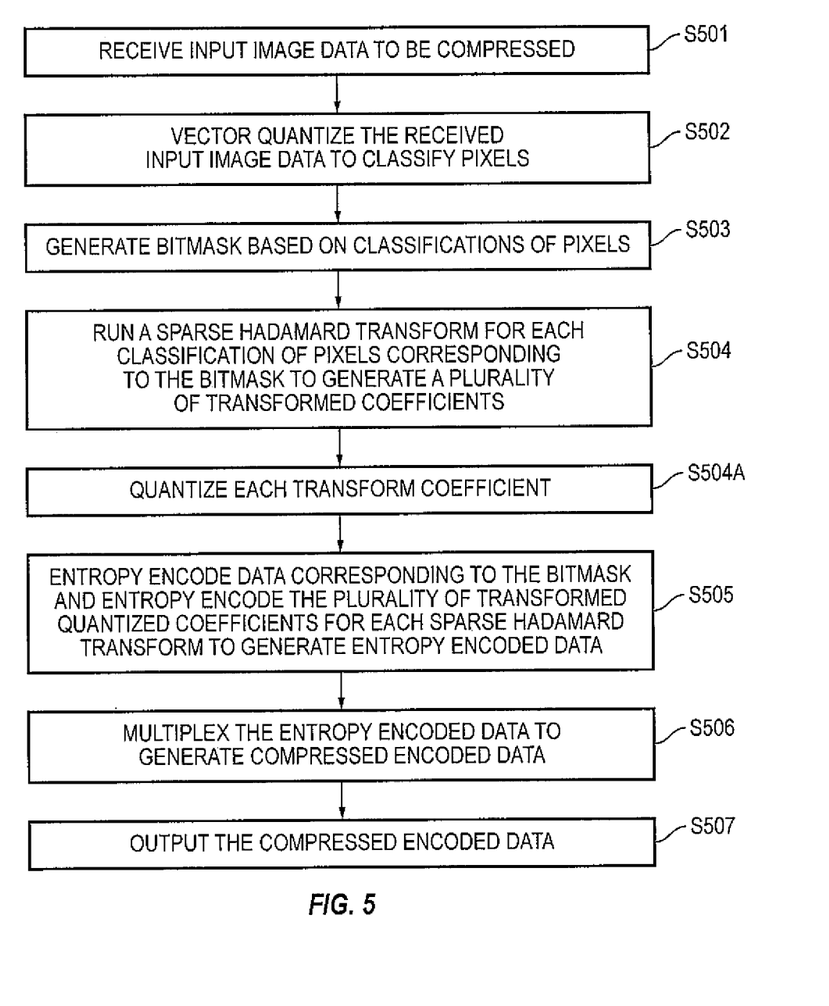
FIG. 5 illustrates a flow diagram of a data compression process according to an embodiment of the present invention.

FIG. 5 illustrates a flow diagram of a data compression process according to an embodiment of the present invention.

Referring to FIG. 5, the data compression process of the present embodiment may be performed by processing logic that may include hardware (e.g., circuitry, dedicated logic, etc.), firmware, software (such as that which is run on a general purpose computer system or on a dedicated machine), or a combination thereof, as will be understood by one of ordinary skill in the art of data compression.

The data compression process of the present embodiment may begin by receiving input image data (e.g., the input image data 302 of FIG. 3) to be compressed (S501). The input image data 302 may correspond to an uncompressed image that is to be compressed and optionally encoded, or may include other data that represents an image or video, such as data including transform coefficients corresponding to the image or video. The input image data may correspond to a natural image, such as the image 20 shown in FIG. 2, an unnatural/computer generated image, such as the uncompressed image 10 shown in FIG. 1, or a combination thereof. In the present embodiment, the input image data corresponds to the image 20 shown in FIG. 2.

After receiving the input image data, the process of the present embodiment may begin digitally processing the input image data using a vector quantizer (e.g., the vector quantizer 304 of FIG. 3) (S502), or by using a statistical mode selector, as will be discussed below with reference to FIG. 7. In the present embodiment, the process performs vector quantization on the input image data representing the uncompressed image to produce quantized image data (e.g., the partitioned image data 306 of FIG. 3)

In digital signal processing, such as analog-to-digital conversion, rate-distortion optimization, or data compression, quantization is commonly used in conjunction with lossy data compression algorithms. Quantization is a non-linear, irreversible process that maps a relatively large set of input values (e.g., values corresponding to the uncompressed input image in the present embodiment) to a smaller set of quantized values, such as by rounding and/or truncation of the input values. The difference between an input value of the set of input values and its corresponding mapped, quantized value is referred to as quantization error.

Vector quantization is a type of quantization that was initially developed for data compression, and uses an algorithmic function to perform quantization. Vector quantization is the application of quantization to multi-dimensional (e.g., vector-valued) input data, and is a quantization technique that is used in signal processing to model probability density functions by the distribution of prototype vectors. Vector quantization divides, or classifies, a large set of values/points/vectors as the input values into classifications having approximately the same number of values/points/vectors closest to them. Each group/class may be represented by its centroid point, as in k-means and other clustering algorithms.

Accordingly, by matching values/points/vectors according to their density, vector quantization is able to identify the density of large and high-dimensioned data. Because data values/points/vectors of a particular classification, or group, are represented by the index of their closest centroid, commonly occurring data is able to be quantized with a low error rate (e.g., low quantization error), while more rare data may be quantized with a higher error rate, making vector quantization suitable for lossy data compression, but also making vector quantization useful for pattern recognition (e.g., a pattern of colors on one side of an edge in an image vs. a pattern of colors on the other side of an edge).

Accordingly, vector quantization may also be referred to as "pattern matching quantization," as it is able to naturally divide the input image into two regions/classifications (e.g., to divide the input image 20 of FIG. 2 into a first region 24 and a second region 26 by identifying the edge 22). Vector quantization first encodes values/points/vectors from a multidimensional vector space into a finite set of quantized values from a discrete subspace of lower dimension. For example, the vector quantizer of the present embodiment may compress the data of the input image by taking a k-dimensional vector [x_1,x_2, . . . , x_k] of varying amplitude levels as the input data, and for each vector, the vector quantizer may choose the nearest matching vector from a smaller set of n-dimensional vectors [y_1,y_2, . . . , y_n], n and k each being integers with n being less than k. Accordingly, all quantized vectors will belong to the vector space formed by all combinations of the n-dimensional vectors [y_1,y_2, . . . , y_n]. The data is therefore compressed, as a lower-space vector will require less data storage space. Due to the density matching property of vector quantization, the compressed data will have an error rate that is inversely proportional to the density.

In the present embodiment, the process is able to identify patterns in the uncompressed input image 20 using vector quantization. For example, the vector quantizer is able to recognize the existence of the edge in the input image (e.g., an "unnatural" edge of a computer generated image, such as the computer generated text of FIG. 1, or an image boundary, such as the edge 22 between the tree and the background of FIG. 2). The vector quantizer is then able to naturally divide the input image 20, or a portion thereof, into two or more regions/classifications 24 and 26 that are divided by the edge 22 (e.g., the first region 24 being on one side of the edge 22, and the second region 26 being on the other side of the edge 22).

Unlike VQ-BTC, which performs vector quantization only on blocks of data (e.g., blocks of data corresponding to the image blocks 14 discussed with respect to FIG. 1), by performing vector quantization on the uncompressed input image 20, the process of the present embodiment may define arbitrarily shaped regions of the input image 20. That is, the process of the present embodiment may identify and classify non-block, or non-contiguous, regions as the classifications of pixels.

Accordingly, the vector quantizer of the present embodiment is able to arbitrarily segment an input image, or a portion thereof, into two (or more) classifications. Furthermore, the vector quantizer is able to preserve the mean of the pixels, and is also able to preserve the second moment. Additionally, and unlike Block Transform Coding, the process of the present embodiment is able to efficiently encode "flat" areas without lowering a quantization step size, and is able to efficiently encode "non-flat" areas without unnecessarily increasing a quantization step size, thereby improving ringing/streaking/overshoot without generating a significantly higher number of bits.

Based on the respective arbitrary classifications defined by the recognized edge 22, the process is able to generate a bitmask (e.g., the bitmask 30 of FIG. 2, or the bitmask 40 of FIG. 1) (S503). Further, the bitmask may be represented by an encoded data stream that may be separately or concurrently sent to the decoder with the other encoded data, as will be discussed with respect to S505 below). The bitmask may be used to define the edge(s) identified by vector quantization. When vector quantization is used to generate two color channels (e.g., the classifications 24 and 26 of FIG. 2, or the classifications 31 and 32 of FIG. 1), the same bitmask may be used for each of the classifications, although the bitmask is inverted for one of the two classifications. That is, a combination of the bitmask and an inverse of the bitmask will cover/correspond to an entirety of an analyzed input image block. It should be noted that the bitmask need not be contiguous, and may correspond to any arbitrary shape or region corresponding to a classification.

The process of the present embodiment may then run a sparse Hadamard transform for each of the corresponding classifications (S504) corresponding to the bitmask. For example, in the present embodiment the process may run a first, sparse Hadamard transform for a first classification, which may correspond to a first color (e.g., first classification 24 of FIG. 2, or first classification 31 of FIG. 1) of pixels of a first region defined by the bitmask, and a second sparse Hadamard transform for a second classification, which may correspond to a second color (e.g., second classification 26 of FIG. 2, or second classification 32 of FIG. 1) of pixels of a second region defined by the bitmask (e.g., defined by the inverse of the bitmask). However, it should be noted that any number of classifications may be selected to be processed by an equal number of transforms, respectively, although each additional classification may cause an increase in overhead. For example, and referring to FIG. 2, the first classification may correspond to only the leaves of the tree, the second classification may correspond to only the sky/background, while a third classification may correspond to the grass/foreground. Additional classifications may increase the size of the output data, but may also improve the quality of the decompressed image.

The process of the present embodiment uses a Hadamard transform, which is able to be performed on any arbitrary shape or classification, and which may be sparsely run. The Hadamard transform may be used in other data compression algorithms, such as JPEG XR and MPEG-4 AVC. In video compression applications, the Hadamard transform is usually used in the form of the sum of absolute transformed differences. However, any transform which is amenable to the sparse method, e.g., the Discrete Cosine Transform or the Discrete Sine Transform would also be possible, with some added complexity to the algorithm.

The Hadamard transform, which may also be referred to as the Walsh transform, or Walsh-Fourier transform, performs an orthogonal, symmetric, involutional, linear operation on $2^m$ real numbers. That is, the Hadamard matrix, which may be simply represented by "$H_m$," is a $2^m$-by-$2^m$ matrix that, via the Hadamard transform, is able to transform $2^m$ real numbers $x_n$ into $2^m$ real numbers $X_k$. In further detail, a partitioned matrix $$\begin{bmatrix} H & H \\ H & -H \end{bmatrix}$$

is a Hadamard matrix of order $2^n$. Accordingly, $$H_1 = [1]; H_2 = \begin{bmatrix} 1 & 1 \\ 1 & -1 \end{bmatrix}, \text{ and}$$

$$H_{2^k} = \begin{bmatrix} H_{2^{k-1}} & H_{2^{k-1}} \\ H_{2^{k-1}} & -H_{2^{k-1}} \end{bmatrix} = H_2 \otimes H_{2^{k-1}};$$

k being an integer that is greater than 1.

In the process of the present embodiment, a different sparse Hadamard transform is used for each of the two classifications of pixels, and is used based on the locations defined by the bitmask. As mentioned above, the same bitmask may be used for each of the two color channels/classifications, wherein the bitmask may be used for the first classification, and an inverse of the bitmask may be used for the second classification. Accordingly, a different sparse transform is required for each color and class, therefore causing six transforms to be used in total. Because the matrices are of reduced rank, the resulting complexity is roughly comparable to three standard transforms. As an alternative, it could be signaled that one of the color channels uses the full block transform, for example in case one of the color channels is constant over both classifications.

By running the sparse Hadamard transform, each of the regions of the image, which are identified by the vector quantizer based on a representative color of the regions, is able to be analyzed as a respective arbitrary shape, which need not be configured as a block. That is, a sparse Hadamard transform may be performed on each of the segmented classifications without the transform being pushed across the edge, thereby preserving the presence of the edge between respective regions, and thereby enabling low-complexity implementation.

With respect to the sparse Hadamard transform, if there is a single masked pixel for a 4-bit bitmask, then additive symmetry will apply, wherein $\alpha 1 + \alpha 2 = \alpha 3 + \alpha 4$, and wherein a third coefficient will always be zero. If there are two masked pixels, then symmetry will apply, wherein $\alpha 1 = \alpha 4$, and $\alpha 2 = \alpha 3$, or wherein a swap condition may apply (e.g., if second and third coefficients are zero, then $\alpha 1 = \alpha 3$, and $\alpha 2 = \alpha 4$), where the positions of a3 and a4 are swapped. If there are three masked pixels, then $\alpha 1 = \alpha 2 = \alpha 3 = \alpha 4$, and all but the first coefficient are non-zero.

The resulting transform (e.g., one resulting transform for each bitmask) uses only addition and subtraction, and does not require any multiplication, except for scaling/a normalization factor, thereby making the sparse Hadamard Transform much faster for data compression than other transforms (e.g., DCT), and therefore making the sparse Hadamard Transform useful for low complexity/high throughput cases. However, it should be noted that the sparse Hadamard Transform may be less effective than the DCT to compact energy for natural images. Furthermore, higher sparse matrices (e.g., 8-point, 16-point, 32-point, etc.) follow the same pattern as a Sparse DCT, where now there is one transform for each $2^n$-bit bitmask. Additionally, because the 2D Hadamard transform is separable, the 2D Sparse Hadamard transform is also separable.

The use of the vector quantizer and the sparse Hadamard transform allows a "one-step" partitioning of the "block" (e.g., a non-square block corresponding to one of the arbitrarily shaped regions). Furthermore, the process may operate with the same efficiency regardless of a shape of the region. Accordingly, ringing/streaking/overshoot is reduced due to a reduction in a number of large differences in the input image to each sparsely run transform. The process of the present embodiment may be used for both variations in luma and chroma, and may also be useful for an arbitrary mix of pixels (e.g., halftone images to be compressed). Further, the process of the present embodiment can also be extended to m-ary classifications, m corresponding to an integer greater than 2 (e.g., ternary classifications).

After running the sparse Hadamard transform on each of the classifications of pixels, and following this with a scalar quantizer for each coefficient to reduce the number of non-zero coefficients (S504A), the process of the present embodiment is able to generate a plurality of quantized coefficients for each transform (e.g., quantized coefficients 315 of FIG. 3), thereby effectively compacting the input data. Once the input data is compacted, the process of the present embodiment is then able to optionally entropy encode the plurality of quantized coefficients for each of the sparse Hadamard transforms respectively corresponding to the classifications of the pixels, and may also entropy encode data that defines the shape and position of the bitmask, thereby generating entropy encoded data (e.g., entropy encoded data 318 of FIG. 3) (S505).

Entropy encoding may rely on statistics (e.g., a statistical imbalance between the numbers of pixels representing the two classifications of pixels) to reduce the overall number of bits to be sent to the decoder. Entropy encoding is a lossless data compression scheme that is independent of the specific characteristics of the medium. Entropy encoding may create and assign a unique prefix-free code to each unique symbol in the input (e.g., the quantized and transformed input data). An entropy encoder (e.g., the entropy encoder 316 of FIG. 3) may then compress data by replacing each fixed-length input symbol with the corresponding variable-length prefix-free output codeword. The length of each codeword is approximately proportional to the negative logarithm of the probability of occurrence of the unique symbol in the input. Accordingly, more common symbols use shorter codes corresponding to fewer bits, thereby reducing the total number of bits to be sent to the decoder.

In addition to being used for digital data compression, an entropy encoder can measure the amount of similarity between streams of data and already existing classifications of data by using an entropy encoder for each class of data. Unknown data may be classified by inputting uncompressed data to each entropy encoder, and by determining which entropy encoder yields the highest compression. The entropy encoder with the best compression is more likely to be trained on data that was most similar to the unknown data.

The process is then able to multiplex the bits corresponding to the entropy encoded data to generate compressed encoded data (e.g., compressed encoded data 322 of FIG. 3) (S506), and send the bits of compressed encoded data, which may include bits used to define the bitmask, to the decoder (S507). It should be noted that the bits corresponding to the bitmask may also be sent to the decoder separately during another process.

Figure 6:
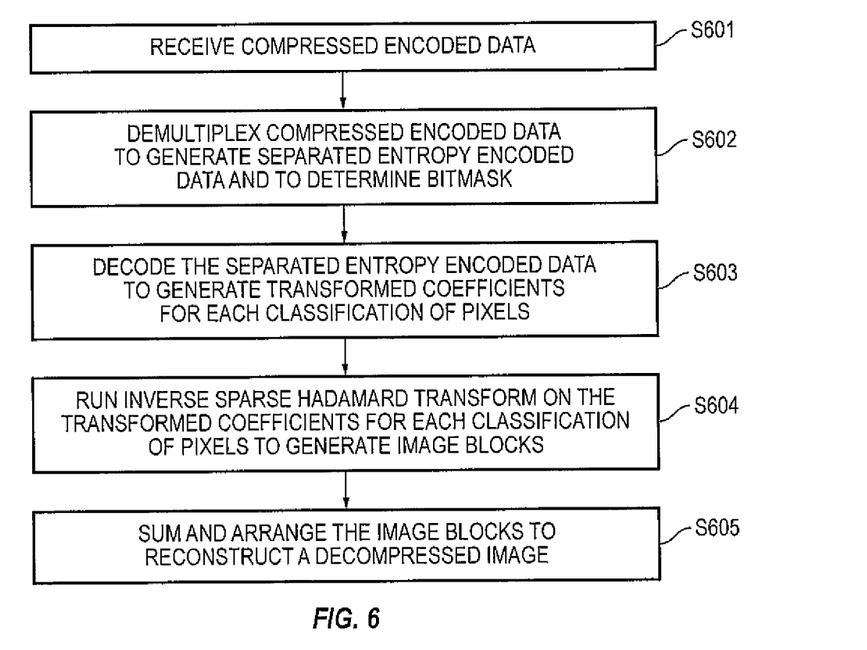
FIG. 6 illustrates a flow diagram of a data decompression process according to an embodiment of the present invention.

FIG. 6 illustrates a flow diagram of a data decompression process according to an embodiment of the present invention.

Referring to FIG. 6, according to another embodiment of the present invention, compressed image data created by the previously discussed embodiment may be received and decoded/decompressed by a video decoder.

For example, a decoder (e.g., video decoder 400) may receive the compressed entropy encoded data (e.g., compressed encoded data 322 of FIG. 3, or compressed encoded data 402 of FIG. 4), which may include data corresponding to the previously defined bitmask (S601). Then, the decoder may begin decoding the encoded data of the data stream to produce the compressed image. First, a bit demultiplexer (e.g., bit demultiplexer 404) may be used to separate the encoded data corresponding to the bitmask, the first classification, and the second classification to generate separated entropy encoded data (e.g., separated entropy encoded data 406) (S602). The separated encoded data may then be decoded by one or more respective entropy decoders (e.g., entropy decoder 408 of FIG. 4) (S603). Then an inverse Hadamard transform may be performed for each classification of pixels based on the decoded bitmask, and based on separated decoded data corresponding to each of the classifications, thereby generating decompressed image blocks (e.g., decompressed image blocks 414 of FIG. 4) (S604). Then a decompressed image may be reconstructed by summing the data together (e.g., using the data summer 416 of FIG. 4) (S605).

Figure 7:
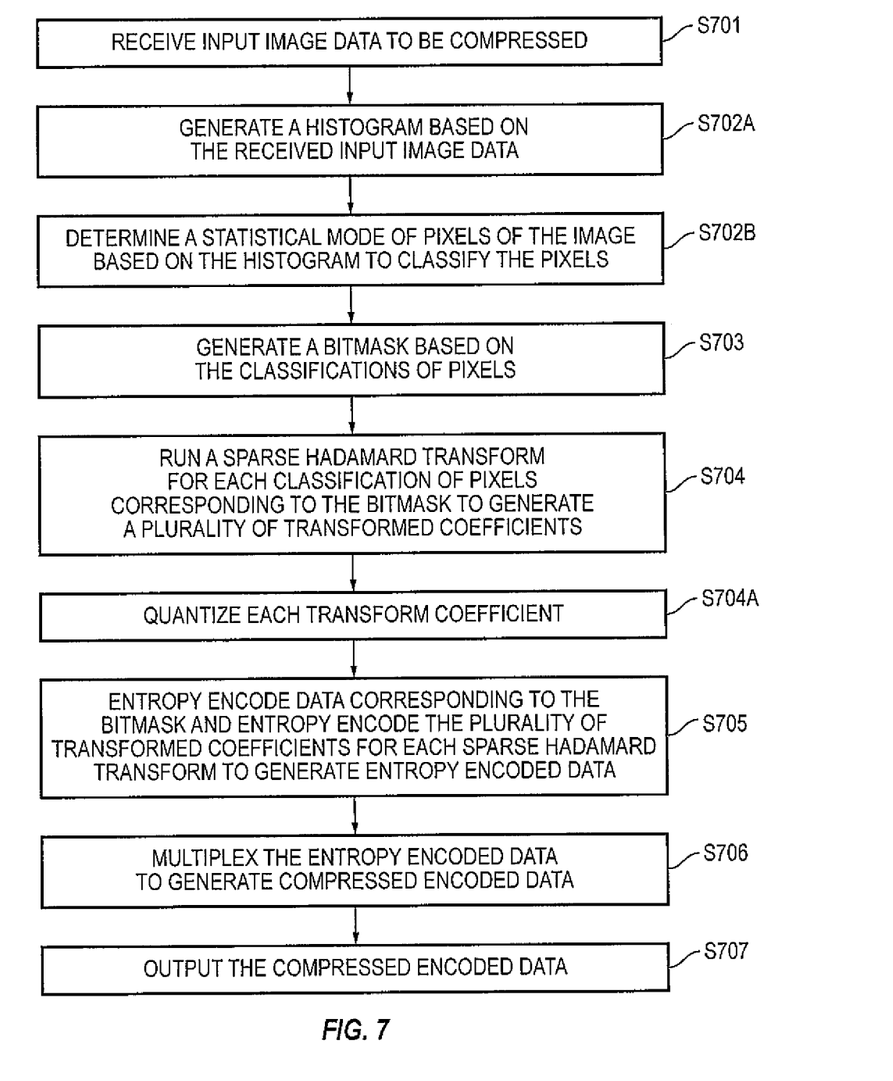
FIG. 7 illustrates a flow diagram of a data compression process according to another embodiment of the present invention.

FIG. 7 illustrates a flow diagram of a data compression process according to another embodiment of the present invention.

Referring to FIG. 7, in an alternative embodiment, a "lightweight" classifier (e.g., a statistical mode selector) may be used as a less expensive alternative to the vector quantizer of the previous embodiment. That is, in the present embodiment, a statistical mode selector may replace the vector quantizer 304 of the video encoder 300 of FIG. 3. To generate classifications of the pixels, a color histogram, or an intensity histogram, may be initially performed based on the received input image data (e.g., by performing binning based on quantization size) (S702A).

A color histogram refers to a histogram that represents the color distribution in an image, and in digital images, the color histogram represents the number of pixels that are to emit light of a color within one of a list including a plurality of color ranges spanning the image's color space. If the input image is monochromatic, an intensity histogram, which is based on the luma of the pixels (as opposed to the chroma), may be generated to determine classifications of the pixels.

Based on the color/intensity histogram, the statistical mode of the pixels (e.g., the color or intensity/brightness value of the pixels that appears most often in a set of the pixels analyzed to create the histogram) may be determined by the statistical mode selector based on the color/intensity emitted by the individual pixels (S702B). When the statistical mode is unique (i.e., when one color or intensity is represented by the pixels more than any other color or intensity), then the process may then generate a bitmask defining the mode pixels (S703).

Because operations S701, S703, 704, S704A, 705, 706, and S707 of the present embodiment respectively correspond to operations S501, S503, S504, S504A, S505, S506, and S507 of FIG. 5, repeated descriptions thereof will be omitted.

While FIGS. 5-7 illustrate aspects of example embodiments of the present invention, according to some embodiments of the present invention, the relative order of the operations described in FIGS. 5-7 may be modified, and/or certain operations may be omitted without departing from the spirit and scope of the present invention.

Accordingly, as described above, embodiments of the present invention provide an improved display stream compression capable of delivering visually lossless images with low complexity-high throughput. Further, embodiments of the present invention achieve improved compression efficiency by intelligent application of the transform so that consistent quantization step size can be maintained, by high throughput via Hadamard transform.

While this disclosure has been described in connection with what is presently considered to be practical exemplary embodiments of the present invention, it is to be understood that the present invention is not limited to the disclosed embodiments, but, on the contrary, is intended to cover various suitable modifications and equivalent arrangements included within the spirit and scope of the appended claims and their equivalents.

What is claimed is:

1. A method of data compression, the method comprising:
receiving image data corresponding to an input image, wherein the input image comprises a plurality of blocks;
generating a plurality of classifications of pixels of the input image by generating a histogram corresponding to features of the pixels of the input image, and classifying the pixels representing a statistical mode as one of the classifications of the pixels, wherein at least two pixel classifications representing color values may be selected to preserve at least one of a mean and a variance of each block of the input image;
generating a bitmask corresponding to the classifications of pixels, wherein the bitmask defines ones of the pixels that correspond to the statistical mode;
running a first sparse transform on a first color classification of pixels of the at least two pixel classifications to generate a first transform coefficients and a second sparse transform on a second color classification of pixels of the at least two pixel classifications to generate a second transform coefficients, the second sparse transform being different from the first sparse transform; and
quantizing each transform coefficient with a scalar quantizer.

2. The method of claim 1, wherein the histogram comprises a color histogram or an intensity histogram, and
wherein the features of the pixels correspond to a color of the pixels or a brightness of the pixels.

3. The method of claim 1, further comprising entropy encoding data representing the plurality of transform coefficients.

4. The method of claim 3, further comprising multiplexing the entropy encoded data to generate compressed encoded data.

5. The method of claim 4, further comprising outputting the compressed encoded data.

6. The method of claim 5, further comprising:
receiving the outputted compressed encoded data;
demultiplexing the outputted compressed encoded data to generate separated entropy encoded data;
entropy decoding the separated entropy encoded data to generate decoded transform coefficients for each of the classifications of pixels;
running an inverse sparse transform that corresponds to the sparse transform on the decoded transform coefficients to generate decompressed image blocks; and
summing and arranging the decompressed image blocks to generate a decompressed image.

7. The method of claim 1, wherein the generating the plurality of classifications of pixels is based on a non-linear edge that is visible in the input image.

8. The method of claim 1, wherein the sparse transform is a sparse Hadamard transform.

9. A data compression device comprising:
an input configured to receive image data corresponding to an input image comprising a plurality of blocks;
a statistical mode selector coupled to the input and configured to generate a histogram corresponding to a color or an intensity of pixels of the input image, to determine a statistical mode of pixels based on the histogram, and to generate a plurality of classifications of pixels based on the determined statistical mode, wherein the plurality of classifications of pixels comprises at least two color classifications of pixels representing color values selected to preserve at least one of a mean and a variance of each block of the input image;
a bitmask generator coupled to the statistical mode selector and configured to receive the plurality of classifications of pixels, and to generate a bitmask based on a plurality of classifications of pixels;
a processor coupled to the bitmask generator and configured to run a first sparse transform in a spatial domain on a first color classification of pixels of the at least two color classifications of pixels to generate a first transform coefficients and a second sparse transform on a second color classification of pixels of the at least two color classifications of pixels to generate a second transform coefficients, the second sparse transform being different from the first sparse transform; and
a scalar quantizer coupled to the processor and configured to generate quantized transform coefficients.

10. The data compression device of claim 9, further comprising an entropy encoder coupled to the processor and configured to entropy encode data representing the transform coefficients.

11. The data compression device of claim 10, further comprising:
a bit multiplexer coupled to the entropy encoder and configured to generate compressed encoded data based on the entropy encoded data; and
an output configured to output the compressed encoded data.

12. A method of color image compression, the method comprising:
receiving image data corresponding to a plurality of pixels and having a plurality of blocks;
classifying the pixels based on the image data to generate a plurality of classifications of the pixels, wherein classifying the pixels comprises generating a histogram corresponding to features of the pixels of an input image, determining a statistical mode of the pixels based on the histogram, and classifying the pixels representing the statistical mode as one of the classifications of the pixels, wherein at least two pixel classifications representing color values may be selected to preserve at least one of a mean and a variance of each block of the input image;
running a first sparse transform for a first color classification of pixels of the at least two pixel classifications to generate a first transform coefficients and a second sparse transform for a second color classification of pixels of the at least two pixel classifications to generate a second transform coefficients, the second sparse transform being different from the first sparse transform; and
running a scalar quantizer for each transform coefficient,
wherein sparseness of the sparse transform corresponds to a spatial domain of the pixels corresponding to the image data.

13. The method of claim 12,
wherein the sparse transform is a sparse Hadamard transform that is run for each classification of pixels after a vector quantizing of the image data.

14. The method of claim 12, further comprising:
encoding the transform coefficients to generate encoded data; and
outputting the encoded data.

* * * * *